July 22, 1969     H. C. HORTON     3,456,549

HEXAGONAL T-NUTS

Filed Oct. 10, 1967

INVENTOR

HERBERT C. HORTON

BY *Robert M. Dunning*

ATTORNEY

# United States Patent Office 3,456,549
Patented July 22, 1969

3,456,549
HEXAGONAL T-NUTS
Herbert C. Horton, 1468 W. California,
St. Paul, Minn. 55108
Filed Oct. 10, 1967, Ser. No. 674,200
Int. Cl. F16b 37/00
U.S. Cl. 85—32                                  1 Claim

ABSTRACT OF THE DISCLOSURE

This invention resides in the provision of a T-nut of hexagonal outline. One end of the nut is hexagonal with the area of the sides equal while the other end is six sided, but with four of the sides of equal relatively narrow width and the remaining sides parallel and relatively long. The nut is thus T-shaped in cross-section. The hexagonal end of the nut is provided with a cylindrical washer face so that the nut can serve either as a T-slot nut or a flange nut.

---

This invention relates to an improvement in hexagonal T-nuts and deals particularly with a type of nut which may be used in place of the T-slot nuts of usual rectangular form, and may also be used in place of the cylindrical flange nuts normally used to clamp fixtures, tools and work in machine tool tables or beds.

Machine tool tables and beds are usually provided with inverted T-shaped slots which are relatively wide at the base, and which includes a relatively narrow slot intermediate the sides on the base which acts as the stem of the T to connect the relatively wide base portion of the slot to the surface of the table or bed. In order to secure fixtures, tools and work on the bed, nuts which are known to the trade as "T-slot nuts" are employed. These nuts include a rectangular base portion which slides freely in the base portion of the slots, and a central rib designed to extend into the stem of the T-shaped slot. Internally threaded apertures extend into the stem of the T-shaped slot. Internally threaded apertures extend through the rib and base portion of the nuts to accommodate vertical studs which extend above the surface of the table or bed.

In clamping material onto the table, a nut commonly known to the trade as a flange nut is often employed. This type of nut includes a hexagonal body having a cylindrical flange at one end. The cylindrical flange is designed to engage the surface being clamped. I have found that a single nut may be produced which may serve the purpose of either of the previous forms of nuts. This structure comprises, in effect, a hexagonal body having an axial internally threaded aperture therethrough, and having two opposed sides notched to form a structure of T-shaped cross-section. The end of the cross-bar portion of the nut is cut to provide a cylindrical washer face. As a result, the single structure may serve either as a T-slot nut or a flange nut, as desired.

A feature of the present invention resides in the provision of a nut which may be formed of a hexagonal bar stock or the like, and which is notched on opposite sides of the center thereof on one face of the nut, one surface of each notch being parallel with the end surfaces of the nut, and the other surfaces of the notches being parallel, and parallel to two opposed sides of the hexagonal end of the notch. Thus one end of the nut is hexagonal having six sides of equal area, while the other end of the nut is also six-sided but includes four relatively narrow side surfaces and two relatively long side surfaces. A cross-section through the nut at right angles to the longer sides of the six-sided end produces a T-shaped form.

A further feature of the present invention resides in the fact that the same type of nut may be used in the T-shaped grooves in the bed or table, and for clamping the work upon the bed or table. As a result, the rectangular T-slot nuts commonly used with such machine tools, and the flange nuts commonly used for clamping the work in place upon the table or bed may be replaced by a single nut structure capable of serving either previous purpose. Thus the inventory of nuts required for use in conjunction with the machine tool table or bed may be cut in half. At the same time, the present nut is no more expensive to manufacture or produce than the rectangular T-slot nuts employed, or the flange nuts previously used.

These and other objects and novel features of the present invention will be more clearly and fully set forth in the following specification and claims.

In the drawings forming a part of the specification:

Figure 1:
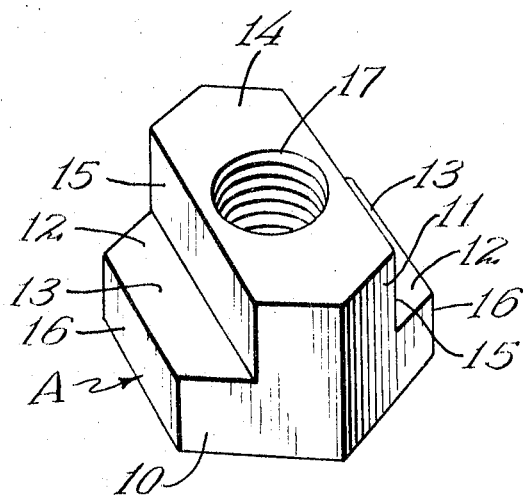
FIGURE 1 is a perspective view of the hexagonal T-nut showing one end thereof.
Figure 3:
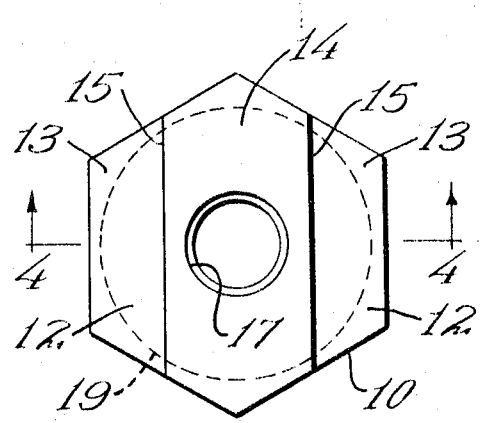
FIGURE 3 is a plan view of the T-nut.
Figure 4:
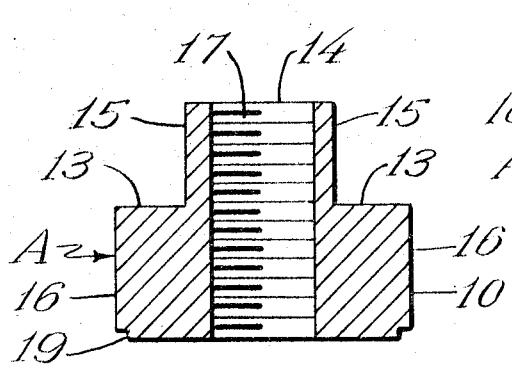
FIGURE 4 is a sectional view through the nut, the position of the section being indicated by the line 4—4 of FIGURE 3.
Figure 2:
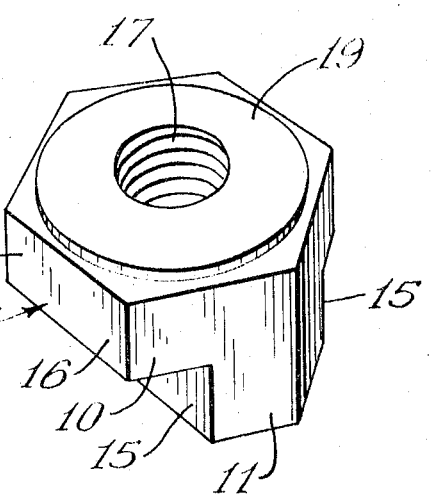
FIGURE 2 is a perspective view of the T-nut showing the opposite end thereof from that illustrated in FIGURE 1.

The T-nut is indicated in general by the letter A. The nut A includes a hexagonal end portion 10, the sides of which are of equal area the other end 11 of the nut is a hexahedron, but the six surfaces are not of equal area.

The structure is formed by milling or cutting away rectangular notches 12 on opposite sides of the hexagonal body. The notches 12 include surfaces 13 which are on a common plane parallel to the end surface 14 of the nut, the end surface 14 being on a plane normal to the axis of the nut. The other surfaces 15 of the rectangular notches 12 are in parallel relation, and are parallel to two opposite sides 16 of the hexagonal end 10 of the nut. The notch surfaces 15 are equally spaced from the nut axis, and are spaced apart a distance equal to, or less than, the sides of the stem of the T-shaped slots in the machine tool table or bed. As a result, the surfaces 15 hold the nut A aligned with the T-shaped slots in the table or bed.

An axially internally threaded aperture 17 extends through the nut and is designed to accommodate a stud or bolt. The structure thus formed may thus be used as a T-slot, such nuts being conventionally rectangular in outline. While the length of the edges is engaging the walls of the T-shaped slot somewhat less than the length of the corresponding edges of rectangular T-slot nuts, they have been found completely adequate to prevent the nuts A from rotating in the T-slots.

As is indicated in the drawings, the periphery of the hexagonal body 10 is cut to provide a cylindrical projection 19 on the hexagonal end 10 of the nut. This cylindrical projection 19 serves in the same manner as a cylindrical flange and thus permits the nut to be used as a cylindrical flange nut of conventional form.

When constructed in the manner described, the same device may serve either as a T-slot nut or as a flange nut. Thus the number of types of nuts required may be cut in half.

In accordance with the patent office statutes, I have described the principles of construction and operation of my improvement in hexagonal T-nuts, and while I have endeavored to set forth the best embodiment thereof, I desire to have it understood that changes may be made without departing from the spirit of my invention.

I claim:

1. A nut including an axially apertured and internally threaded body including one axial end of hexagonal outline having six sides of equal area, and shape, and having its other axial end six-sided with four sides of equal area and shape, and two parallel sides of substantially greater area and similar shape, the body being T-shaped in cross-section with the axial aperture extending through the stem of the T, said parallel sides of greater area being parallel to two parallel sides of said hexagonal end, and an axially projecting cylindrical portion on said hexagonal end, the area of said hexagonal end which extends beyond said other axial end providing coplanar shoulder surfaces on both sides of said other axial end.

References Cited

UNITED STATES PATENTS

| 2,062,640 | 12/1936 | Clouse | 85—32 |
| 2,281,482 | 4/1942 | Crayton | 85—32 |
| 3,078,088 | 2/1963 | Einsiedler | 269—91 |
| 3,283,794 | 11/1966 | Steward et al. | 85—32 |

FOREIGN PATENTS

| 1,489,830 | 6/1967 | France. |

EDWARD C. ALLEN, Primary Examiner